US007918660B2

(12) United States Patent
Babin et al.

(10) Patent No.: US 7,918,660 B2
(45) Date of Patent: Apr. 5, 2011

(54) INJECTION MOLDING ACTUATOR POSITION SENSING

(75) Inventors: Denis Babin, Georgetown (CA); Valery Ten, Burlington (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 181 days.

(21) Appl. No.: 12/248,597

(22) Filed: Oct. 9, 2008

(65) Prior Publication Data

US 2009/0098233 A1 Apr. 16, 2009

Related U.S. Application Data

(60) Provisional application No. 60/979,509, filed on Oct. 12, 2007.

(51) Int. Cl.
*B29C 45/23* (2006.01)

(52) U.S. Cl. ............... 425/145; 425/151; 425/564

(58) Field of Classification Search ............... 425/562, 425/563, 564, 565, 566, 145, 169, 171
See application file for complete search history.

(56) References Cited

U.S. PATENT DOCUMENTS

| 2,773,284 | A | 12/1956 | Kelly |
| 4,919,606 | A | 4/1990 | Gellert |
| 5,055,026 | A | 10/1991 | Gordon |
| 5,356,576 | A | 10/1994 | Fischbach |
| 5,387,099 | A | 2/1995 | Gellert |
| 5,531,581 | A * | 7/1996 | Donnell, Jr. ............... 425/145 |
| 6,179,604 | B1 | 1/2001 | Takeda |
| 6,638,050 | B2 | 10/2003 | Bazzo |
| 6,830,447 | B2 | 12/2004 | Babin |
| 6,884,061 | B2 | 4/2005 | Okamura et al. |
| 6,893,249 | B2 | 5/2005 | Babin |
| 7,044,728 | B2 | 5/2006 | Schunck et al. |
| 7,048,532 | B2 | 5/2006 | Tabassi |
| 7,234,929 | B2 | 6/2007 | Vasapoli et al. |
| 2004/0115295 | A1 | 6/2004 | Schunck et al. |
| 2006/0177538 | A1 | 8/2006 | Tabassi |

FOREIGN PATENT DOCUMENTS

| FR | 2 821 010 A1 | 8/2002 |
| JP | 6-242022 A | 9/1994 |
| WO | WO-02/066224 A1 | 8/2002 |
| WO | WO-2006/080807 A1 | 8/2006 |

OTHER PUBLICATIONS

"Needle Position Control", *Synventive Molding Systems Brochure* Jul. 25, 2006, p. 18.
Extended European Search Report, EP Application No. 08017557.3-2307, dated Feb. 6, 2009.
Office Action from State Intellectual Property Office, P.R. China, CN Application No. 200810178578.0, dated Sep. 6, 2010.

* cited by examiner

*Primary Examiner* — Tim Heitbrink
(74) *Attorney, Agent, or Firm* — Medler Ferro PLLC

(57) ABSTRACT

A nozzle has a valve pin for controlling flow of molding material through a nozzle melt passage. An actuator has a stationary part and a movable part. The actuator further has an extending rod connected to the movable part thereof and a block connected to the rod, the block being movable with the moveable part of the actuator. A pivoting linkage element is rotatably connected to the block of the actuator and is connected to the valve pin of the nozzle. The pivoting linkage element moves the valve pin in response to movement of the movable part of the actuator. A bracket is connected to the stationary part of the actuator. Two sensors are connected to the bracket for detecting different positions of the block. The sensors may be air proximity sensors.

18 Claims, 3 Drawing Sheets

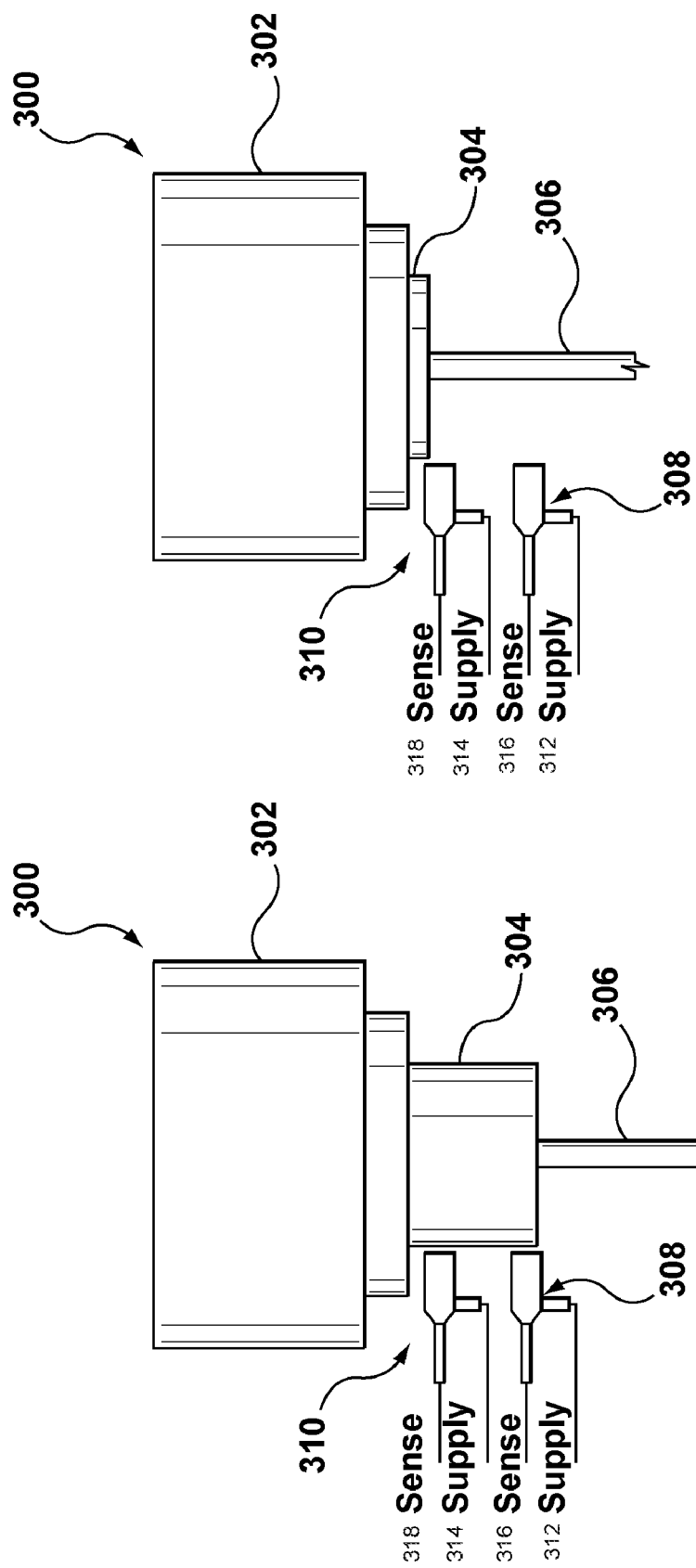

INJECTION MOLDING ACTUATOR POSITION SENSING

CROSS-REFERENCE TO RELATED APPLICATION

This application claims the benefit of U.S. provisional patent application No. 60/979,509 filed Oct. 12, 2007, which is hereby incorporated by reference in its entirety herein.

BACKGROUND

1. Field of the Invention

The present invention relates to an injection molding apparatus and, more particularly, to an apparatus and method for sensing an actuator position.

2. Related Art

The injection molding environment is subject to high heat, temperature cycling, and vapors and residues which may be corrosive or form gummy deposits. Moving parts required to function in such an environment, besides having to be designed against such conditions, are sometimes provided with transducers to detect position, speed, and other attributes for effective control of an injection molding apparatus. For example, an actuator may be provided with mechanical limit switches that are triggered by a moving part of the actuator to indicate a position of part of the injection molding apparatus.

However, switches such as the above can wear out or fail, which is usually compounded by a hostile molding environment, can be unduly influenced by temperature, and are not readily adaptable to monitoring complex parts or parts with unusual modes of operation.

SUMMARY OF THE INVENTION

According to one aspect of the present invention, a nozzle system for an injection molding apparatus includes a nozzle having a valve pin for controlling flow of molding material through a nozzle melt passage, an actuator having a stationary part and a movable part, and a pivoting linkage element rotatably connected to the movable part of the actuator and connected to the valve pin of the nozzle. The pivoting linkage element moves the valve pin in response to movement of the movable part of the actuator. At least one sensor is provided for detecting a position of the movable part of the actuator.

BRIEF DESCRIPTION OF THE FIGURES

Embodiments of the present invention will now be described more fully with reference to the accompanying drawings where like reference numbers indicate similar structure.

FIGS. 3*a* and 3*b* are schematic views of a valve pin actuating system according to another embodiment of the present invention.

DETAILED DESCRIPTION OF THE INVENTION

Figure 1:
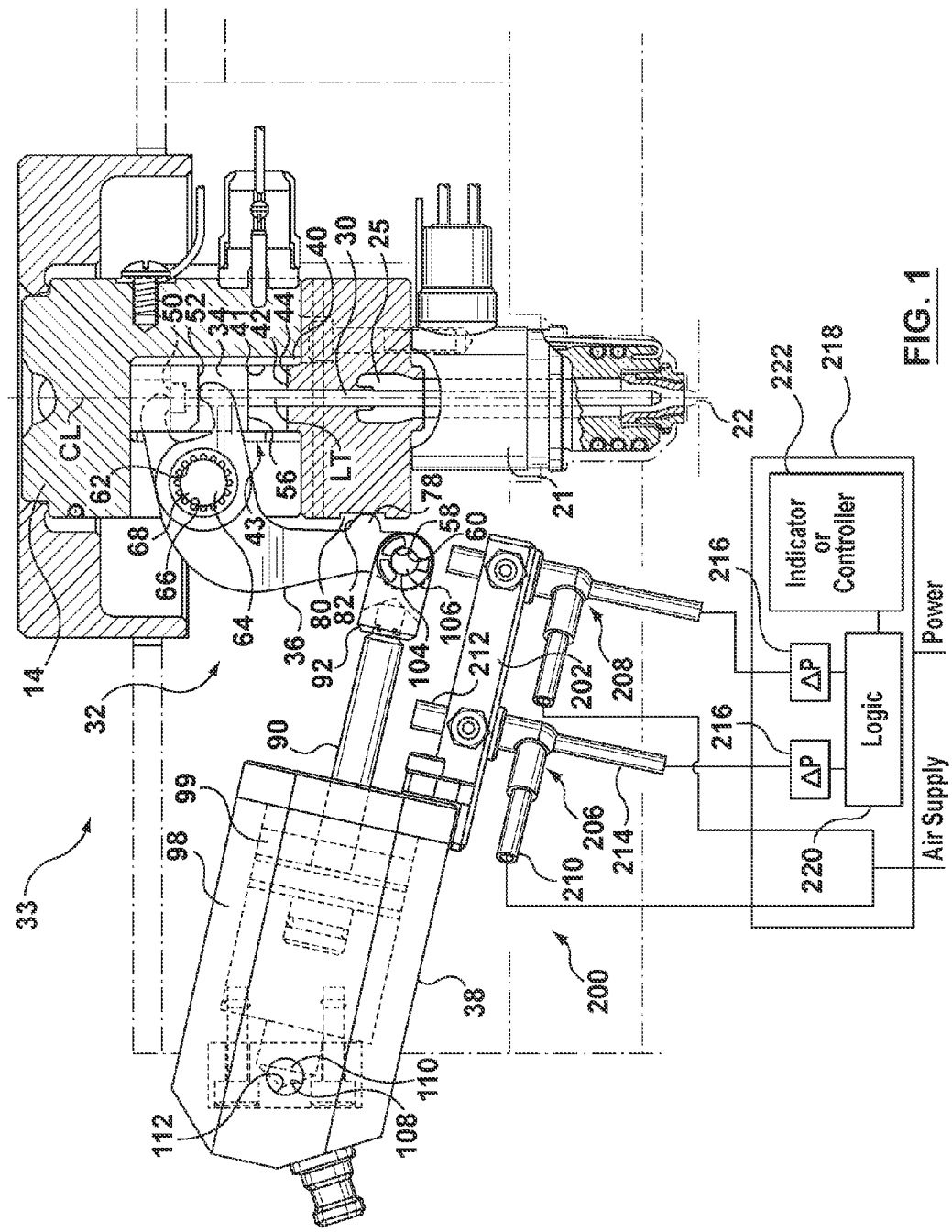
FIG. 1 is a cross-sectional view of a nozzle system according to an embodiment of the present invention.

Reference is made to FIG. 1, which shows an embodiment of a nozzle system 33, which includes a nozzle 14, a valve pin 30, and a valve pin actuating mechanism 32. The nozzle system 33 can be used in any injection molding apparatus, such as a hot half, hot runner, and the like. Such an injection molding apparatus typically includes a manifold and can include one or more of the nozzle systems 33 for feeding melt from the manifold to one or more mold cavities. The features and aspects of other embodiments described herein can be used accordingly with the present embodiment.

The actuating mechanism 32 includes a valve pin guiding element 34, a linkage element 36, an actuator 38, and a sensor assembly 200. The valve pin actuating mechanism 32 approaches the valve pin 30 generally laterally, and moves the valve pin 30 through a range of positions, or between any suitable first and second positions. For example, for the embodiment as shown, where the valve pin 30 is positioned near a mold gate 22, the valve pin actuating mechanism 32 can be used to move the valve pin 30 between an open (first) position (as shown in FIG. 1), wherein melt flow is permitted to flow through the mold gate 22 to enter a mold cavity (not shown); and a closed (second) position, wherein the melt flow is prevented from entering the mold cavity (see FIG. 2). Alternatively, the actuating mechanism 32 can be used to move the valve pin 30 to a second position to permit less flow through a nozzle melt passage 25, than in the first position. Alternatively, the actuating mechanism 32 can be used to move a valve pin 30 between first and second positions in other portions of an injection molding apparatus, such as, for example, in sprue mechanisms between manifold plates in a stack-mold.

The valve pin guiding element 34 supports and guides the valve pin 30. A sleeve 40 defines a guiding element channel 41 in which the valve pin guiding element 34 slides. The valve pin guiding element 34 slides in the guiding element channel 41 along a line of travel LT so that the valve pin 30 moves in the nozzle melt passage 25 between the first and second positions. Sleeve 40 has an aperture 43 therethrough permitting the linkage element 36 to connect to the guiding element 34. The guiding element 34 includes a first, outer, receiving surface 50, and two second, outer, receiving surfaces 52. The first and second receiving surfaces 50 and 52, receive the linkage element 36. The first and second receiving surfaces 50 and 52 can be planar and perpendicular to the line of travel LT of the guiding element 34 in the channel 41. Alternatively, one of receiving surfaces 50 and 52, (i.e., either receiving surface 50 or both of receiving surfaces 52), is planar and substantially perpendicular to the line of travel LT of the guiding element 34 in the channel 41, and the other of the surfaces 50 or 52 is at least angled suitably for engagement by the linkage element 36 and movement of the guiding element 34 along the line of travel LT. Any suitable holding and guiding means for valve pin 30 can alternatively be used, instead of the guiding element 34. For example, guiding element 34 can be integrally joined to the valve pin 30.

A limit surface 42 is positioned to limit the travel of the guiding element 34 towards the mold gate 22. The limit surface 42 may be a surface on any suitable component of the injection molding apparatus. For example, the limit surface may be on a valve bushing 44. The valve pin guiding element 34 has a shoulder 56 that cooperates with the limit surface 42 to limit the travel of the guiding element 34, and the valve pin 30 in moving towards the mold gate 22.

The linkage element 36 connects the actuator 38 to the valve pin guiding element 34. The linkage element 36 includes a first connector 58 that rotatably connects the linkage element 36 to the actuator 38. The first connector 58 may be, for example, a bore 60. Alternatively, the first connector 58 may be any suitable connection means for providing a rotatable connection between the linkage element 36 and the actuator 38. The linkage element 36 also includes a second connector 62, which pivotally connects linkage element 36 to a portion 64 on the injection molding apparatus. The second connector 62 and portion 64 may be any suitable pivotal connection means, such as, for example, a bore 66 and a shaft 68. The linkage element 36 further includes a stop 78 that may be integrally formed into the linkage element 36. A limit surface 80 that is adapted to cooperate with the stop 78 may be positioned on any suitable component of the nozzle system 33 or the injection molding apparatus. The stop 78 and limit surface 80 cooperate to limit the rotational travel of the linkage element 36 during movement of the valve pin 30 away from the mold gate 22. The stop 78 has an engagement surface 82 that engages the limit surface 80 for stopping the rotation of the linkage element 36 at a selected angle.

The actuator 38 may be any type of actuator, such as a pneumatic or hydraulic cylinder, or an electrical or magnetic actuator. The actuator 38 has a stationary part 98 (e.g., a housing) and a moveable part 99 (e.g., a piston or comparable part). The actuator 38 includes an extending rod 90 and a block 92 connected to the rod 90. The rod 90 is connected to the movable part 99 of the actuator 38 and is, for example, thread-connected to the block 92. The block 92 has a connector 104 for rotatably connecting the actuator 38 to the first connector 58 on the linkage element 36. The connector 104 may be any suitable type of connector, such as, for example, a pin 106, which is received in the bore 60. The actuator 38 mounts to the injection molding apparatus by another connector 108 which permits rotation of the actuator 38 thereabout. The connector 108 may be any suitable type of connector, such as for example a pin 110 for mounting in a cylindrical aperture 112 on the injection molding apparatus. In this way, the pivoting linkage element 36 is rotatably connected to the movable part 99 of the actuator 38.

Further details relating to the nozzle system 33 and related components can be found in U.S. Pat. No. 6,893,249 and U.S. Pat. No. 7,048,532, which are incorporated in their entireties herein by reference.

The sensor assembly 200 includes a bracket 202 bolted to the stationary part 98 of the actuator 38, and a first sensor 206 and a second sensor 208 connected to the bracket 202.

The bracket 202 serves to hold the sensors 206, 208 to the actuator 38. The sensors 206, 208 can be secured to the bracket 202 by set screws and/or lock washers, for example, so that the positions of the sensors 206, 208 are adjustable.

The first and second sensors 206, 208 are identical, although in other embodiments they can be different. In this embodiment, the first and second sensors 206, 208 are air proximity sensors, such as those available from O'Keefe Controls Co. of Trumbull, Conn., but in other embodiments other kinds of sensors can be used. In still another embodiment, only one sensor is used. Each sensor 206, 208 includes an air supply line 210, an air outlet port 212, and a pressure measurement line 214. Air is supplied to each sensor 206, 208 via the air supply line 210 and is jetted out from the air outlet port 212. The pressure measurement line 214 extends out to a pressure transducer 216 located in a control module 218. When an obstruction is located in front of the air outlet port 212, the pressure transducer 216 sees a higher pressure than when the obstruction is absent.

In this embodiment, the pressure transducer 216 is a binary transducer, such as an air/electric switch also available from O'Keefe, that can be selected for or tuned to a certain differential (gauge) pressure. That is, the pressure transducer 216 can have a threshold, so that pressure on the line 214 greater than the threshold causes the pressure transducer 216 to output a corresponding signal. In this way, each sensor 206, 208 can be selected or configured to detect the presence and absence of the block 92, which is closer to the sensors 206, 208 than the rod 90 is (e.g., the O'Keefe sensors have a range of about 3 mm or ⅛") and which has a more obstructive surface than the rod 90 does. In other embodiments, the pressure transducer 216 can output a signal proportional to the pressure on the line 214, and the control module 218 can use such signal to determine the nature of the obstruction to differentiate the rod 90 from the block 92.

The control module 218 also contains logic 220 connected to the pressure transducers 216 and an indicator 222 connected to the logic 220. The logic 220 is a circuit or chip that converts signals from the pressure transducers 216 into a signal suitable for the indicator 222. The indicator 222 can be a circuit or chip, such as one or more LEDs, for example, that simply indicates when the block 92 is in the different positions. In another embodiment, the indicator 222 is a single LED that indicates when the block 92 has failed to move into the commanded position, which further requires the logic 220 to receive and process a signal from an actuator controller indicating such commanded position. In another embodiment, the indicator 222 is replaced or supplemented by a controller, such as a circuit or chip, that commands the actuator 38 based on the measured position of the block 92. The logic 220 and indicator/controller 222 are optional and combinable, i.e., a single chip can be used. In another embodiment, the pressure transducers 216 can be directly connected to one or more indicators without any intermediate logic. The logic 220 and indicator/controller 222 can also be incorporated into an actuator controller, a hot runner controller, an injection molding machine controller, or the like. The functions of the above embodiments are combinable as well. The control module 218 also feeds air on a supply air line to the pressure measurement lines 214.

Figure 2:
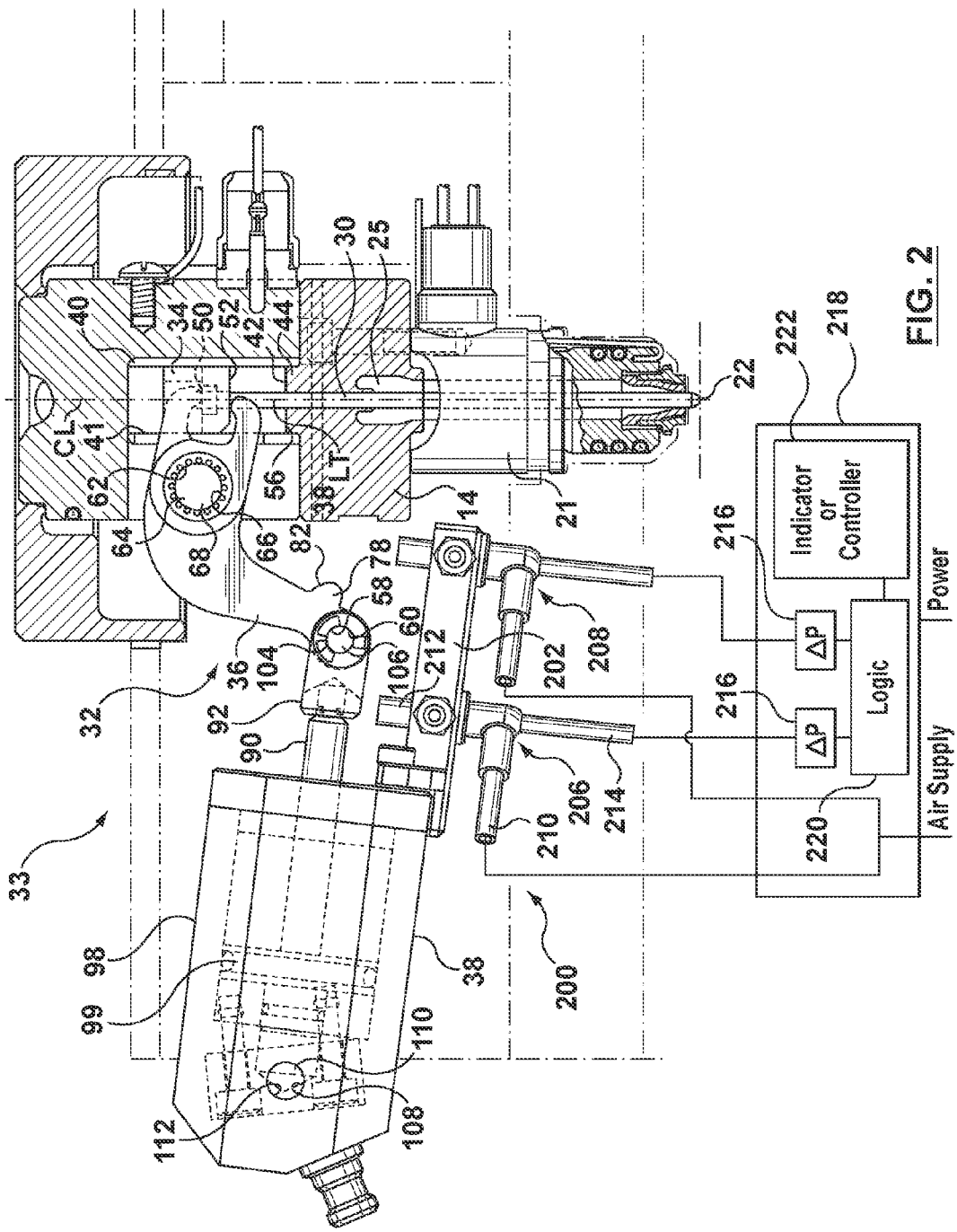
FIG. 2 is a cross-sectional view of the nozzle system of FIG. 1 with the valve pin in a different position.

In operation, when only the sensor 208 detects the presence of the block 92, it is determined that the valve pin 30 is open (FIG. 1). When only the sensor 206 detects the presence of the block 92, it is determined that the valve pin 30 is closed (FIG. 2). If neither sensor 206, 208 detects the presence of the block 92, it is determined that the valve pin 30 is in an intermediate position. And finally, if both sensors 206, 208 detect the presence of the block 92, an error has likely occurred because in this embodiment the spacing of the sensors 206, 208 is greater than the length of the block 92. In other embodiments, where the sensors 206, 208 are located in different positions, different logic may exist. For example, a sensor may be positioned near the middle of the path of the block 92 to detect movement of the block 92 past the sensor. In such an embodiment, the block 92 would be detected as absent, present, and then absent again, by a single sensor. Such determinations of valve pin position can be processed by the logic 220 and outputted by the indicator 222 in any way intuitive to a human operator or suitable for further processing, as described above.

FIGS. 3a and 3b show another embodiment of the present invention. In the description of this embodiment, only differing features and aspects of the present embodiment are described in detail. For description of the like parts, the other embodiments can be referenced. The features and aspects of other embodiments described herein can be used accordingly with the present embodiment.

A valve pin actuating system 300 for an injection molding apparatus, such as a hot runner or hot half, includes an actuator 302, a valve pin holder 304 connected to a movable part of the actuator 302, a valve pin 306 connected to and extending from the valve pin holder 304, a first sensor 308, and a second sensor 310. The valve pin 306 controls flow of molding material through a nozzle and/or manifold (not shown).

The first and second sensors 308, 310 are air proximity sensors and thus have air supply lines (312, 314) and pressure measurement lines (316, 318). The sensors 308, 310 can be connected to any stationary part of the actuator 302 (e.g., housing) or surrounding structure (e.g., actuator plate or back plate). The sensors 308, 310 can be operationally connected to a control module such as that of FIGS. 1 and 2. The sensors 308, 310 are proximate the valve pin holder 304 and near enough to detect the presence or absence of the valve pin holder 304. In another embodiment, a single air proximity sensor is used.

In operation, when both sensors 308, 310 detect the presence of the valve pin holder 304, it is determined that the valve pin 306 is fully down, as shown in FIG. 3a. When both sensors 308, 310 do not detect the presence of the valve pin holder 304, it is determined that the valve pin 306 is fully up, as shown in FIG. 3b. And finally, when only the sensor 310 detects the presence of the valve pin holder 304, it is determined that the valve pin 306 is in an intermediate position. In other embodiments, where the sensors may be located in different positions, and different logic may exist. For example, a sensor may be positioned near the middle of the valve pin holder 304 to detect movement of the valve pin holder 304 past the sensor. In such an embodiment, the valve pin holder 304 would be detected as absent, present, and then absent again, by a single sensor. Such determinations of valve pin position can be processed as described above with respect to the embodiment shown in FIGS. 1 and 2.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A nozzle system for an injection molding apparatus, comprising:
   a nozzle having a valve pin for controlling flow of molding material through a nozzle melt passage;
   an actuator having a stationary part and a movable part;
   a pivoting linkage element rotatably connected to the movable part of the actuator and connected to the valve pin of the nozzle, the pivoting linkage element moving the valve pin in response to movement of the movable part of the actuator; and
   at least one sensor for detecting a position of the movable part of the actuator, wherein the at least one sensor is an air proximity sensor.

2. The nozzle system of claim 1, wherein the actuator has an extending rod connected to the movable part thereof and a block connected to the rod, the block movable with the moveable part of the actuator, the pivoting linkage element rotatably connected to the block.

3. The nozzle system of claim 2, wherein the block has a more obstructive surface than the rod.

4. The nozzle system of claim 3, wherein two sensors are provided, each sensor being positioned to detect a different position of the block.

5. The nozzle system of claim 1, further comprising a bracket bolted to the stationary part of the actuator, the at least one sensor being connected to the bracket.

6. The nozzle system of claim 5, wherein the at least one sensor is adjustably secured to the bracket.

7. The nozzle system of claim 1, further comprising a pressure transducer connected to the at least one sensor.

8. The nozzle system of claim 7, further comprising an indicator connected to the pressure transducer, the indicator outputting a determination of valve pin position.

9. The nozzle system of claim 8, further comprising logic connected between the pressure transducer and the indicator for converting a signal from the pressure transducer into a signal for the indicator.

10. The nozzle system of claim 7, further comprising a controller that commands the actuator based on a position of the movable part of the actuator detected by the at least one sensor.

11. The nozzle system of claim 10, further comprising logic connected between the pressure transducer and the controller for converting a signal from the pressure transducer into a signal for the controller.

12. A nozzle system for an injection molding apparatus, comprising:
   a nozzle having a valve pin for controlling flow of molding material through a nozzle melt passage;
   an actuator having a stationary part and a movable part, the actuator further having an extending rod connected to the movable part thereof and a block connected to the rod, the block movable with the moveable part of the actuator;
   a pivoting linkage element rotatably connected to the block of the actuator and connected to the valve pin of the nozzle, the pivoting linkage element moving the valve pin in response to movement of the movable part of the actuator;
   a bracket connected to the stationary part of the actuator; and
   at least two sensors connected to the bracket for detecting different positions of the block, wherein the sensors are air proximity sensors.

13. The nozzle system of claim 12, wherein the sensors are adjustably secured to the bracket.

14. The nozzle system of claim 12, wherein the block has a more obstructive surface than the rod.

15. The nozzle system of claim 12, further comprising:
   two pressure transducers, each pressure transducer connected to one of the sensors;
   logic connected to the pressure transducers; and
   an indicator connected to the logic, the indicator for outputting a determination of valve pin position.

16. The nozzle system of claim 12, further comprising:
   two pressure transducers, each pressure transducer connected to one of the sensors;
   logic connected to the pressure transducers; and
   a controller that commands the actuator based on a position of the movable part of the actuator detected by the sensors.

17. A valve pin actuating system for a nozzle of an injection molding apparatus, comprising:
   an actuator having a stationary part and a movable part;
   a valve pin holder connected to the movable part of the actuator;
   a valve pin connected to and extending from the valve pin holder, the valve pin having an up position and a down position for controlling flow of molding material; and
   at least one air proximity sensor proximate the valve pin holder for detecting the presence or absence of the valve pin holder to determine whether the valve pin is in the down position or the up position, the at least one air proximity sensor connected to an air supply line and a pressure measurement line that is connected to a pressure transducer.

18. A valve pin actuating system of claim 17, further comprising a control module having the pressure transducer.

* * * * *